(12) United States Patent
Sun

(10) Patent No.: US 9,771,299 B2
(45) Date of Patent: Sep. 26, 2017

(54) OPTICAL GLASS WITH NEGATIVE ANOMALOUS DISPERSION AND OPTICAL ELEMENT

(71) Applicant: CDGM GLASS CO., LTD, Chengdu, Sichuan (CN)

(72) Inventor: Wei Sun, Chengdu (CN)

(73) Assignee: CDGM GLASS CO., LTD, Changdu (CN)

( * ) Notice: Subject to any disclaimer, the term of this patent is extended or adjusted under 35 U.S.C. 154(b) by 0 days.

(21) Appl. No.: 15/110,962

(22) PCT Filed: Mar. 10, 2015

(86) PCT No.: PCT/CN2015/073937
§ 371 (c)(1),
(2) Date: Jul. 12, 2016

(87) PCT Pub. No.: WO2015/135465
PCT Pub. Date: Sep. 17, 2015

(65) Prior Publication Data
US 2016/0326042 A1     Nov. 10, 2016

(30) Foreign Application Priority Data

Mar. 13, 2014    (CN) .......................... 2014 1 0092455

(51) Int. Cl.
C03C 3/064    (2006.01)
C03C 3/066    (2006.01)
G02B 27/00    (2006.01)

(52) U.S. Cl.
CPC .............. *C03C 3/066* (2013.01); *C03C 3/064* (2013.01); *G02B 27/0062* (2013.01)

(58) Field of Classification Search
CPC .......... C03C 3/064; C03C 3/066; C03C 3/068
See application file for complete search history.

(56) References Cited

U.S. PATENT DOCUMENTS 5,340,778 A * 8/1994 Kloss ..................... C03C 3/064
                                                            501/52
5,424,255 A    6/1995 Kassner
5,858,898 A    1/1999 Nakahara et al.
6,380,112 B1 * 4/2002 Kolberg ................. C03C 3/064
                                                            501/77
2001/0038054 A1 * 11/2001 Mori ..................... B60R 22/415
                                                            242/382.2
2002/0048093 A1 * 4/2002 Suzuki .................. G02B 13/04
                                                            359/752
2004/0132605 A1    7/2004 Uehara
2007/0207913 A1 * 9/2007 Kintaka ............... C04B 35/495
                                                            501/135
2015/0065330 A1 * 3/2015 Koide .................... C03C 3/064
                                                            501/79
2015/0094198 A1 * 4/2015 Wolff .................... C03C 3/068
                                                            501/42

FOREIGN PATENT DOCUMENTS

| CN | 1112526 A | 11/1995 | | |
|---|---|---|---|---|
| CN | 1225903 A | 8/1999 | | |
| GB | 1141627 A | 1/1969 | | |
| JP | WO 2013161441 A1 * | 10/2013 | ............. | C03C 3/064 |
| SU | 547404 A1 | 2/1977 | | |

OTHER PUBLICATIONS

Jun. 11, 2015 International Search Report issued in International Patent Application No. PCT/CN2015/073937.

* cited by examiner

*Primary Examiner* — Elizabeth A Bolden
(74) *Attorney, Agent, or Firm* — Gang Luo

(57) ABSTRACT

The invention provides an environment-friendly optical glass with excellent negative anomalous dispersion performance and an optical element. The optical glass with excellent negative anomalous dispersion performance contains 0-5% of $Nb_2O_5$, exclusive of $TiO_2$ and F, wherein the relative partial dispersion Pg, F of the optical glass is less than 0.57, and the negative anomalous dispersion $\Delta Pg$, F is less than and equal to −0.008. There is no need to add any non-environmentally friendly element into the optical glass provided by the present invention, with the refractive index of 1.60-1.65, the Abbe number of 40-46, and the negative anomalous dispersion $\Delta Pg$, F of generally less than −0.01. Therefore, the optical glass, with excellent negative anomalous dispersion performance and environmental performance, is applicable to be extensively applied to digital camera, digital video, camera phone, etc.

13 Claims, No Drawings

US 9,771,299 B2

OPTICAL GLASS WITH NEGATIVE ANOMALOUS DISPERSION AND OPTICAL ELEMENT

TECHNICAL FIELD

The invention relates to an optical glass and optical element, wherein the optical glass has a refractive index (nd) of 1.60~1.65 and an Abbe number (vd) of 40~46, in particular to an optical glass with excellent negative anomalous dispersion ($\Delta$Pg, F) performance and good environmental performance as well as an optical element.

BACKGROUND

Optical glass is an indispensable important part in optical equipment and photoelectric products. In the wake of widespread popularity of photoelectric products such as smart phone and SLR camera in recent years, higher requirements are proposed for the performance of the optical glass, for example, the optical glass is required to have the performance of eliminating all or part of the residual chromatic aberration of the secondary spectrum to the best extent possible, thus it is necessary for optical glass to provide a negative anomalous dispersion performance.

At present, the known optical glass with the negative anomalous dispersion performance adopts $B_2O_3$—$Al_2O_3$—PbO system, but the content of PbO in the glass of such system is larger, so the chemical stability of the glass is poor, and the environmental requirements cannot be met. For the glass system containing no PbO in the Chinese patent with the Publication No. of 1225903, the German patent with the Publication No. of 4032566, the Chinese patent with the Publication No. of 102199001 and the United States patent with the Publication No. of 4200467, Ti or F, which is an element destroying the anomalous dispersion performance, is introduced to these glass, or these glass contains more $Nb_2O_5$, which also destroys the anomalous dispersion performance of glass. In addition, U.S. Pat. No. 4,200,467 contains a higher proportion of Na ion, but this will result in serious fractures to the glass structure, increasing glass devitrification trend, and be extremely unfavorable for the expansion coefficient, heat stability, chemical stability and mechanical strength of the optical glass.

SUMMARY

The technical problem to be solved by the present invention is to provide an environment-friendly optical glass with excellent negative anomalous dispersion performance and optical element.

To solve the technical problem, the present invention provides an optical glass with negative anomalous dispersion, containing the following components by weight percentage: 0-5% of $Nb_2O_5$, exclusive of $TiO_2$ and F, wherein the relative partial dispersion of the optical glass Pg, F is less than 0.57, and the negative anomalous dispersion $\Delta$Pg, F is less than or equal to −0.008.

Furthermore, it further contains the following components by weight percentage: 20-40% of $SiO_2$, 15-40% of $B_2O_3$, 15-40% of $Ta_2O_5$, and 5-20% of $ZrO_2$, 5-15% of $R_2O$, wherein the $R_2O$ includes one or more of $K_2O$, $Na_2O$ and $Li_2O$; $ZnO+WO_3+RO$ is 0-5%, and the RO includes one or more of BaO, SrO, CaO and MgO.

Furthermore, containing: 0-2% of $Nb_2O_5$.
Furthermore, containing: 22-38% of $SiO_2$.
Furthermore, containing: 16-40% of $B_2O_3$.
Furthermore, containing: 17-38% of $Ta_2O_5$.
Furthermore, containing: 6-19% of $ZrO_2$.
Furthermore, containing 6-14% of $R_2O$, wherein the $R_2O$ includes one or more of $K_2O$, $Na_2O$ and $Li_2O$.
Furthermore, containing ZnO, $WO_3$ and RO, and 1-4.5% of $ZnO+WO_3+RO$, wherein the RO includes one or more of BaO, SrO, CaO and MgO.
Furthermore, the refractive index of the optical glass is 1.60-1.65, and the Abbe number is 40-46.
Furthermore, the negative anomalous dispersion $\Delta$Pg, F of the optical glass is less than −0.01.

An optical element formed by using the optical glass with negative anomalous dispersion.

The beneficial effects of the present invention are as follows: there is no need to add any non-environmentally friendly element into the optical glass provided by the present invention, with the refractive index of 1.60-1.65, the Abbe number of 40-46, the relative partial dispersion Pg, F of less than 0.57, and the negative abnormal dispersion $\Delta$Pg, F of less than and equal to −0.008, generally less than −0.01. Therefore, this optical glass, with excellent negative anomalous dispersion performance and environmental performance, is applicable to be extensively used in the digital camera, digital video, camera phone, etc.

DETAILED DESCRIPTION

The below will describe all components contained in the optical glass of the present invention in detail, and these components are represented by weight percentage.

$SiO_2$, a glass formation body, is an oxide component necessary to form glass. A certain amount of $SiO_2$ may make the optical glass have a better chemical stability, improve the transparency of glass and increase the high temperature viscosity of glass. The chemical stability of the glass is poor if the content of $SiO_2$ is less than 20%; the refractive index of glass may not within the required range and the high temperature viscosity of glass is larger if the content of $SiO_2$ is higher than 40%. Therefore, the content of $SiO_2$ is 20-40%, preferably 22-38%.

$B_2O_3$ is also a network formation oxide of optical glass, and it plays the most important role in reducing the shortwave dispersion of glass and improving the negative anomalous dispersion of glass in the present invention. If the content of $B_2O_3$ is less than 15%, the high temperature viscosity of glass is high, and both the melting property and the negative anomalous dispersion are poor; but if the content of $B_2O_3$ is higher than 40%, the chemical stability of glass gets worse, and glass is easy to subject to devitrification. Therefore, the content of $B_2O_3$ is 15-40%, preferably 16-40%.

$Ta_2O_5$ is an oxide which can remarkably improve the refractive index and negative anomalous dispersion of optical glass, and a better negative anomalous dispersion performance is obtained in the present invention through addition of $Ta_2O_5$. If the content of $Ta_2O_5$ is less than 15%, the purpose of obtaining a better negative anomalous dispersion performance will be never achieved; but if the content of $Ta_2O_5$ is higher than 40%, the melting property of glass gets worse, and it is difficult to form glass with a better homogeneity, thus increasing the production cost of glass. Therefore, the content of $Ta_2O_5$ is 15-40%, preferably 17-38%.

$ZrO_2$ can improve the refractive index and the negative anomalous dispersion performance of optical glass, but it cannot function if the content of $ZrO_2$ is less than 5%; if the content of $ZrO_2$ is higher than 20%, this refractory oxide will result in poor melting property of glass, thus not obtaining glass with good homogeneity. Therefore, the content of ZrO$_2$ is 5-20%, preferably 6-19%.

R$_2$O, an alkali metal oxide, is one or more of K$_2$O, Na$_2$O, Li$_2$O, and a better glass flux, and optical glass with better homogeneity can be obtained through adding a moderate amount of R$_2$O. However, if the total amount of R$_2$O is less than 5%, fluxing will not function, and the high temperature viscosity of glass may be larger; if the total amount of R$_2$O is higher than 15%, the chemical stability of optical glass will get worse. Therefore, the content of R$_2$O is 5-15%, preferably 6-14%. Furthermore, a lower percentage of Na$_2$O is used in the present invention, and assisted with other components, so that the glass is not easy to subject to devitrification, and it is extremely favorable for the expansion coefficient, heat stability, chemical stability and mechanical strength of the optical glass. Specifically, the content of Na$_2$O in the present invention is 0-12%, preferably 2-8%.

Nb$_2$O$_5$ can effectively improve the refractive index of glass, and will obviously increase the dispersion of the shortwave part at the same time of increasing the dispersion of the medium wave part, consequently to increase the negative anomalous dispersion performance of the optical glass. But if the content of Nb$_2$O$_5$ is too high, the negative anomalous dispersion performance will be destroyed. The present invention can not only obtain a good negative anomalous dispersion performance, but also reduce the cost of glass through reducing the content of Nb$_2$O$_5$. Therefore, the content of Nb$_2$O$_5$ is 0-5%, preferably 0-2%.

ZnO, WO$_3$, RO can effectively regulate the refractive index and the Abbe number of glass, wherein RO, an alkaline earth metal oxide, is one or more of BaO, SrO, CaO, MgO. The total content of ZnO, WO$_3$ and RO(ZnO+WO$_3$+RO) is 0-5%, preferable 1-4.5%.

Moreover, TiO$_2$ and F in any form which will destroy the negative anomalous dispersion performance will not be introduced to the present invention.

The optical glass provided by the present invention is made according to the preparation method known by a person skilled in the art, i.e., melting, clarifying, stirring the raw materials for homogenization, lowering the temperature to a proper temperature for molding, then obtaining the optical glass provided by the present invention, with the refractive index of 1.60-1.65, the Abbe number of 40-46 and having an excellent negative anomalous dispersion performance.

Each performance parameter of the optical glass provided by the present invention is tested by the following methods:

The refractive index, Abbe number and Pg, F are measured as per Test Methods of Colorless Optical Glass (GB/T 7962.1-2010): Refractive Index and Coefficient of Dispersion.

Verified by the test, the optical glass provided by the present invention has the following properties: the refractive index (nd) ranges from 1.60 to 1.65, the Abbe number (vd) ranges from 40 to 46, relative partial dispersion ΔPg, F is less than 0.57, and the negative anomalous dispersion is less than or equal to −0.008, generally ΔPg,F is less than −0.01, having good chemical stability and environmental performance.

The present invention further provides an optical element formed by the optical glass in the present invention, so this optical element has all above-mentioned properties of the optical glass in the present invention. The optical element of the present invention has greater negative anomalous dispersion, and there is no need to add any non-environmentally friendly element, with the refractive index (nd) of 1.60-1.65, and the Abbe number (vd) of 40-46. The optical element provided by the present invention is applied to the digital camera, digital video, camera phone, etc.

Embodiments

To further understand the technical scheme of the present invention, preferred implementations of the present invention will be described by combining the following specific embodiments. But it should be noted and understood that, these embodiments are only to better describe the characteristics and advantages of the present invention, without limiting the claims of the present invention.

The optical glass provided by the embodiments 1-30 in the present invention contains the components by weight percentage and corresponding properties as shown in Tables 1-3. The desired optical glass can be obtained by weighing the components of the optical glass in each embodiment according to the weight percentage in Tables 1-3, and adding them into an optical glass smelter after uniformly mixing; and pouring the molten glass into the pre-heated metal mold for molding and annealing after melting, clarification, stirring for homogenization at a proper process temperature and lowering the temperature to a proper temperature. The present invention provides an optical glass with excellent negative anomalous dispersion performance, containing the components and corresponding properties as below: results of the refractive index (vd), dispersion (nF−nC), Abbe number (vd), relative partial dispersion (Pg, F), negative anomalous dispersion (ΔPg, F) are as shown in embodiments 1-30 from Table 1 to Table 3. Thus, Pg, F and ΔPg, F are explained by using the following formula.

$$Pg,F=(ng-nF)/(nF-nC) \quad (1)$$

$$Px,y=mx,y\ vd+bx,y \quad (2)$$

$$Px,y=mx,y\ vd+bx,y+\Delta Px,y \quad (3)$$

$$\Delta Pg,F=Pg,F-0.6457+0.001703vd \quad (4)$$

In the above formula, the relative partial dispersion is calculated by the formula (1). For most glass, the linear relation of the formula (2) exists: select H-K6 and F4 as the reference glass, and obtain the slope mx,y and the intercept bx,y; then select the optical glass with the negative anomalous dispersion performance of the present invention to correct the aberration; ΔPx, y in the formula (3) represents this deviation value; and finally the specific value of ΔPg, F is calculated by the formula (4).

TABLE 1

| Component | Embodiments | | | | | | | | | |
|---|---|---|---|---|---|---|---|---|---|---|
| (wt %) | 1 | 2 | 3 | 4 | 5 | 6 | 7 | 8 | 9 | 10 |
| SiO$_2$ | 22.5 | 20.21 | 26.95 | 25.06 | 21.21 | 37.1 | 20.07 | 22.13 | 22.45 | 23.37 |
| B$_2$O$_3$ | 27.5 | 24.39 | 22.46 | 25.06 | 30.75 | 15.38 | 35.69 | 29.51 | 26.00 | 23.93 |
| ZrO$_2$ | 10.83 | 14.98 | 13.17 | 5.64 | 5.3 | 9.05 | 7.43 | 6.15 | 5.00 | 6.54 |

TABLE 1-continued

| Component (wt %) | Embodiments | | | | | | | | | |
|---|---|---|---|---|---|---|---|---|---|---|
| | 1 | 2 | 3 | 4 | 5 | 6 | 7 | 8 | 9 | 10 |
| $Ta_2O_5$ | 24.58 | 22.65 | 29.79 | 28.82 | 29.69 | 21.72 | 23.05 | 28.96 | 26.35 | 28.05 |
| $K_2O$ | 6.67 | 8.71 | 3.74 | 6.27 | 5.3 | 9.05 | 5.2 | 4.1 | 6.86 | 4.67 |
| $Li_2O$ | 0 | 1.05 | 0.45 | 0 | 0 | 0 | 1.49 | 1.64 | 2.32 | 1.87 |
| $Na_2O$ | 2.5 | 4.53 | 1.95 | 2.51 | 2.12 | 1.81 | 1.49 | 1.93 | 2.73 | 2.21 |
| $R_2O$ | 9.17 | 14.29 | 6.14 | 8.78 | 7.42 | 10.86 | 8.18 | 7.67 | 11.90 | 8.75 |
| $Nb_2O_5$ | 1.67 | 0 | 0 | 1.88 | 1.59 | 1.36 | 1.12 | 1.64 | 3.55 | 4.67 |
| $ZnO + WO_3 + RO$ | 3.74 | 3.49 | 1.5 | 4.76 | 4.03 | 4.52 | 4.46 | 4.22 | 4.75 | 4.67 |
| Total | 100 | 100 | 100 | 100 | 100 | 100 | 100 | 100 | 100 | 100 |
| nd | 1.61529 | 1.61975 | 1.62529 | 1.62202 | 1.61512 | 1.60541 | 1.60103 | 1.61637 | 1.61973 | 1.63648 |
| nF − nC | 0.01359 | 0.01347 | 0.01363 | 0.01386 | 0.01386 | 0.01318 | 0.01332 | 0.01376 | 0.01389 | 0.01507 |
| vd | 45.29 | 46 | 45.87 | 44.87 | 44.37 | 45.95 | 45.14 | 44.81 | 44.63 | 42.25 |
| Pg, F | 0.5582 | 0.5576 | 0.5568 | 0.5587 | 0.5579 | 0.5592 | 0.5586 | 0.5568 | 0.5589 | 0.5628 |
| ΔPg, F | −0.0104 | −0.0098 | −0.0108 | −0.0106 | −0.0122 | −0.0082 | −0.0102 | −0.0126 | −0.0108 | −0.0109 |

TABLE 2

| Component (wt %) | Embodiments | | | | | | | | | |
|---|---|---|---|---|---|---|---|---|---|---|
| | 11 | 12 | 13 | 14 | 15 | 16 | 17 | 18 | 19 | 20 |
| $SiO_2$ | 21.28 | 20.13 | 20.31 | 21.29 | 21.17 | 20 | 23.86 | 22.62 | 26.43 | 40 |
| $B_2O_3$ | 24.19 | 25.16 | 25.85 | 24.33 | 25.4 | 25.45 | 15.51 | 23.81 | 19.58 | 15.39 |
| $ZrO_2$ | 6.77 | 7.05 | 13.85 | 11.41 | 13.29 | 16.12 | 19.28 | 10.48 | 19.58 | 8.17 |
| $Ta_2O_5$ | 29.02 | 30.19 | 25.85 | 29.66 | 27.57 | 24.6 | 25.45 | 35.71 | 15.47 | 19.61 |
| $K_2O$ | 4.84 | 5.03 | 2.77 | 6.08 | 2.95 | 5.09 | 4.77 | 3.1 | 6.85 | 8.17 |
| $Li_2O$ | 1.93 | 2.01 | 0.92 | 0 | 0.85 | 0.85 | 2.39 | 0.36 | 1.96 | 0 |
| $Na_2O$ | 2.28 | 2.38 | 2.59 | 2.28 | 2.37 | 2.38 | 3.98 | 1.55 | 2.31 | 1.63 |
| $R_2O$ | 9.05 | 9.42 | 6.28 | 8.36 | 6.17 | 8.32 | 11.14 | 5 | 11.12 | 9.8 |
| $Nb_2O_5$ | 4.84 | 4.03 | 3.69 | 1.52 | 1.77 | 1.7 | 0 | 1.19 | 3.92 | 3.61 |
| $ZnO + WO_3 + RO$ | 4.83 | 4.03 | 4.15 | 3.42 | 4.62 | 3.82 | 4.77 | 1.19 | 3.92 | 3.41 |
| Total | 100 | 100 | 100 | 100 | 100 | 100 | 100 | 100 | 100 | 100 |
| nd | 1.64662 | 1.64382 | 1.64516 | 1.63666 | 1.63930 | 1.63749 | 1.65000 | 1.64645 | 1.63709 | 1.60000 |
| nF − nC | 0.01594 | 0.01539 | 0.01502 | 0.01472 | 0.01469 | 0.01441 | 0.01496 | 0.01520 | 0.01402 | 0.01309 |
| vd | 40.56 | 41.84 | 42.94 | 43.26 | 43.53 | 44.23 | 43.46 | 42.54 | 45.45 | 45.84 |
| Pg, F | 0.5675 | 0.5632 | 0.5618 | 0.5602 | 0.5606 | 0.5603 | 0.5631 | 0.5610 | 0.5603 | 0.5595 |
| ΔPg, F | −0.0091 | −0.0112 | −0.0108 | −0.0118 | −0.0110 | −0.0101 | −0.0086 | −0.0123 | −0.0080 | −0.0081 |

TABLE 3

| Component (wt %) | Embodiments | | | | | | | | | |
|---|---|---|---|---|---|---|---|---|---|---|
| | 21 | 22 | 23 | 24 | 25 | 26 | 27 | 28 | 29 | 30 |
| $SiO_2$ | 20 | 34.23 | 26.45 | 22.3 | 24.36 | 23.15 | 21.12 | 23.37 | 30.05 | 20.21 |
| $B_2O_3$ | 40 | 15 | 19.56 | 27.52 | 21.03 | 24.11 | 31.68 | 23.03 | 16.45 | 37.61 |
| $ZrO_2$ | 6.62 | 8.58 | 20 | 5 | 9.26 | 6.53 | 5.09 | 6.54 | 5.38 | 6.5 |
| $Ta_2O_5$ | 23.27 | 20.86 | 15 | 24.42 | 40 | 27.99 | 28.5 | 35 | 38.01 | 21.87 |
| $K_2O$ | 0 | 7.64 | 6.85 | 7.27 | 3.98 | 4.67 | 5.09 | 4.67 | 5.02 | 4.46 |
| $Li_2O$ | 0 | 2.62 | 1.96 | 2.08 | 0 | 1.86 | 0 | 1.87 | 1.55 | 1.05 |
| $Na_2O$ | 5.12 | 4.74 | 2.31 | 2.45 | 1.38 | 2.2 | 2.04 | 2.21 | 2.06 | 1.3 |
| $R_2O$ | 5.12 | 15 | 11.12 | 11.8 | 5.36 | 8.73 | 7.13 | 8.75 | 8.63 | 6.81 |
| $Nb_2O_5$ | 5 | 1.32 | 3.92 | 4.16 | 0 | 4.67 | 1.53 | 1.8 | 1.48 | 2.62 |
| $ZnO + WO_3 + RO$ | 0 | 5 | 3.96 | 4.8 | 0 | 4.82 | 4.96 | 1.5 | 0 | 4.37 |
| Total | 100 | 100 | 100 | 100 | 100 | 100 | 100 | 100 | 100 | 100 |
| nd | 1.60018 | 1.61738 | 1.62763 | 1.61545 | 1.65000 | 1.63993 | 1.61248 | 1.63795 | 1.64377 | 1.60005 |
| nF − nC | 0.01306 | 0.01346 | 0.01402 | 0.01367 | 0.01529 | 0.01600 | 0.01388 | 0.01503 | 0.01492 | 0.01351 |
| vd | 45.95 | 45.87 | 44.76 | 45.01 | 42.52 | 40 | 44.13 | 42.43 | 43.15 | 44.42 |
| Pg, F | 0.5578 | 0.5588 | 0.5610 | 0.5586 | 0.5612 | 0.5667 | 0.5578 | 0.5615 | 0.5636 | 0.5618 |
| ΔPg, F | −0.0096 | −0.0088 | −0.0085 | −0.0104 | −0.0121 | −0.0109 | −0.0127 | −0.0119 | −0.0086 | −0.0083 |

As illustrated in the above embodiments, there is no need to add any non-environmentally friendly element into the optical glass provided by the present invention, with the refractive index of 1.60-1.65, the Abbe number of 40-46, the relative partial dispersion Pg, F of less than 0.57, and the negative anomalous dispersion ΔPg, F of less than and equal to −0.008, generally less than −0.01. Therefore, the optical glass, with excellent negative anomalous dispersion performance, chemical stability and environmental performance, is extensively applied to digital camera, digital video, camera phone, etc.

The invention claimed is:

1. An optical glass with negative anomalous dispersion, comprising the following components by weight percentage: 0-5% of $Nb_2O_5$, 20-40% of $SiO_2$, 15-40% of $B_2O_3$, 15-40% of $Ta_2O_5$, 5-20% of $ZrO_2$, 5-15% of $R_2O$, wherein the $R_2O$ includes one or more of $K_2O$ $Na_2O$ and $Li_2O$, and $ZnO+WO_3+RO$ of 0-5%, wherein the RO includes one or more of BaO, SrO, CaO and MgO, exclusive of $TiO_2$ and F, wherein the relative partial dispersion of the optical glass Pg, F is less than 0.57, and wherein the negative anomalous dispersion ΔPg, F is less than or equal to 0.01.

2. The optical glass with negative anomalous dispersion according to claim 1, wherein the $ZnO+WO_3+RO$ is 1.5%.

3. The optical glass with negative anomalous dispersion according to claim 1, containing 0-2% of $Nb_2O_5$.

4. The optical glass with negative anomalous dispersion according to claim 1, containing 22-38% of $SiO_2$.

5. The optical glass with negative anomalous dispersion according to claim 1, containing 16-40% of $B_2O_3$.

6. The optical glass with negative anomalous dispersion according to claim 1, containing 17-38% of $Ta_2O_5$.

7. The optical glass with negative anomalous dispersion according to claim 1, containing 6-19% of $ZrO_2$.

8. The optical glass with negative anomalous dispersion according to claim 1, containing 6-14% of $R_2O$, wherein the $R_2O$ includes one or more of $K_2O$, $Na_2O$ and $Li_2O$.

9. The optical glass with negative anomalous dispersion according to claim 1, containing ZnO, $WO_3$ and RO, wherein $ZnO+WO_3+RO$ is 1-4.5%.

10. The optical glass with negative anomalous dispersion according to claim 1, containing 0-12% of $Na_2O$.

11. The optical glass with negative anomalous dispersion according to claim 1, containing 2-8% of $Na_2O$.

12. The optical glass with negative anomalous dispersion according to claim 1, wherein the refractive index of the optical glass is 1.60-1.65, and the Abbe number is 40-46.

13. An optical element formed by using the optical glass with negative anomalous dispersion according to claim 1.

* * * * *